United States Patent [19]
Klober et al.

[11] Patent Number: 5,273,313
[45] Date of Patent: Dec. 28, 1993

[54] GAS-GENERATING MODULE FOR AN AIRBAG UTILIZED IN MOTOR VEHICLES

[75] Inventors: Martin Klober, Heideck; Wolfgang Schwarz, Nürnberg, both of Fed. Rep. of Germany

[73] Assignee: Diehl GmbH, Nürnberg, Fed. Rep. of Germany

[21] Appl. No.: 886,411

[22] Filed: May 20, 1992

[30] Foreign Application Priority Data

May 23, 1991 [DE] Fed. Rep. of Germany ....... 4116879

[51] Int. Cl.⁵ .............................................. B60R 21/28
[52] U.S. Cl. ................................... 280/741; 280/736; 149/19.2; 149/19.8
[58] Field of Search ........................ 280/736, 741, 729; 422/164, 165, 166; 102/530, 531; 149/19.2, 19.8

[56] References Cited

U.S. PATENT DOCUMENTS

| | | |
|---|---|---|
| 3,776,570 | 12/1973 | Weman ................... 280/738 |
| 3,920,575 | 11/1975 | Shiki et al. ............ 280/728 R |
| 4,021,275 | 5/1977 | Kishi et al. ............. 280/741 |
| 4,547,235 | 10/1985 | Schneiter et al. ...... 280/741 |
| 4,734,141 | 3/1988 | Cartwright et al. .... 280/741 |
| 4,931,111 | 6/1990 | Poole et al. ............ 280/741 |
| 5,005,486 | 4/1991 | Lenzen ................ 102/202.5 |
| 5,066,039 | 11/1991 | Shitanoki et al. ...... 280/741 |
| 5,094,475 | 3/1992 | Olsson et al. ........... 280/741 |

FOREIGN PATENT DOCUMENTS

| | | |
|---|---|---|
| 3913034 | 11/1989 | Fed. Rep. of Germany . |
| 4001864 | 8/1990 | Fed. Rep. of Germany . |
| 3932576 | 4/1991 | Fed. Rep. of Germany ...... 280/736 |
| 0273748 | 11/1989 | Japan ................. 280/736 |
| 0088343 | 3/1990 | Japan ................. 280/741 |
| 0958177 | 9/1982 | U.S.S.R. ............. 280/736 |

*Primary Examiner*—Mitchell J. Hill
*Assistant Examiner*—Paul Dickson
*Attorney, Agent, or Firm*—Scully, Scott, Murphy & Presser

[57] ABSTRACT

A gas-generating module for an airbag utilized in motor vehicles, which includes a gas-generating composition and an igniting composition arranged within a container. The gas-generating composition is presently in the shape of a foil-like layer or coating, or alternatively consists of a granulate, and is constituted from components which are a mixture of a composition which is based on a metal azide and an oxidizing agent; a first binder for the granulation of the composition; a second elastic binder and a rapidly combusting igniting mixture whereby the elastic foil layer is arranged in a casing which is pressure-resistant up to a specified degree and which consists of a relatively gas-tight fabric.

8 Claims, 1 Drawing Sheet

GAS-GENERATING MODULE FOR AN AIRBAG UTILIZED IN MOTOR VEHICLES

BACKGROUND OF THE INVENTION

1. Field of the Invention

The present invention relates to a gas-generating module for an airbag utilized in motor vehicles, which includes a gas-generating composition and an igniting composition arranged within a container.

2. Discussion of the Prior Art

From the disclosure of German Published Patent Appln. No. 39 13 C34 A1, it has become known that a gas-generating medium can be applied in the form of a thin coating or layer on the internal surface of the bag. Contemplated for use as the gas-generating medium is a coating constituted from a gelatinous explosive. However, this type of explosive is difficult to control during the reaction sequence.

From the disclosure of German Patent 40 01 864 C2 there has become known a gas generator which operates in accordance with the high-lo (hi-lo) pressure system. Supported within a sheetmetal housing with filters are propellant plates, including a detonator which is arranged in the propellant plates. The ignition housing, which is constituted from metal, possesses rupture or breaking locations and an ignitable material.

Upon a triggering of the igniter, there builds up a gas pressure within the ignition housing so as to, at the reaching of a specified pressure, tear open the ignition housing and ignite the propellant plates.

A gas generator of that kind is extremely expensive to manufacture. Consequently, efforts have been expanded to develop significantly less expensive gas generators.

SUMMARY OF THE INVENTION

Accordingly, it is an object of the present invention to provide a combustible gas-generating composition in the shape of a foil which is controllable within a high-low pressure system, whereby the type of construction of the high-low pressure system is relatively inexpensive and possesses a small-sized constructional volume.

The foregoing object of the invention is achieved for a gas-generating module of the type as described in that the composition is presently in the shape of a foil-like layer or coating, and is constituted from components which are a mixture of a composition which is based on a metal azide and an oxidizing agent; a first binder for the granulation of the composition; a second elastic binder and a rapidly combusting igniting mixture whereby the elastic foil layer is arranged in a casing which is pressure-resistant up to a specified degree and which consists of a relatively gas-tight fabric.

Pursuant to another embodiment of the invention the composition may be present in the form of granules and is constituted from components which include a mixture of a composition based on a metal azide and an oxidizing agent; a first binder for the granulation of the composition and an igniting mixture whereby the granules are arranged within a casing which is pressure-resistant up to a specified degree and which consists of a relatively gas-tight coated fabric.

Of importance to the invention, on the one hand, is the flat manner of construction for the gas-generating module such that, in accordance with the need of the required value in the folded-together airbag, a plurality of modules can be fastened to suitable locations of the wall structure through either adhesion or sewing seams.

It is also possible to effect loose insertion of the modules into the folds of the airbag.

A surprisingly simple manner of construction is obtained for the module through the employment of the casings which are pressure-resistant up to a specified degree as described hereinabove; in effect, rendering the manufacture thereof inexpensive and in view of the omission of metal parts in the required construction thereof, there is eliminated the danger that during the development of gas the fabric of the airbag could be punctured by torn-off metal parts. A casing of that type is a prerequisite for the complete and rapid conversion of the gas-forming composition.

In accordance with the foregoing inventive concepts, the utilization of the gas-generating composition in the shape of an elastic foil as well as in the form of a granulate is quite advantageous. The granulate is either loosely poured or in the form of a sieve netting; in effect, partially slightly interconnected contained within the quasi pressure-resistant casing.

The gas which is developed from the gas-generating composition and the igniting mixture is not harmful to persons during the period of time within which it is employed.

There is achieved a simple ignition of the foil-like composition when the igniting mixture is applied on the interior sides thereof, and also a good ignitability for the granulate as described hereinabove.

BRIEF DESCRIPTION OF THE DRAWINGS

Reference may now be had to the following detailed description of preferred embodiments of the invention, taken in conjunction with the accompanying drawings; in which.

DETAILED DESCRIPTION

Figure 1:
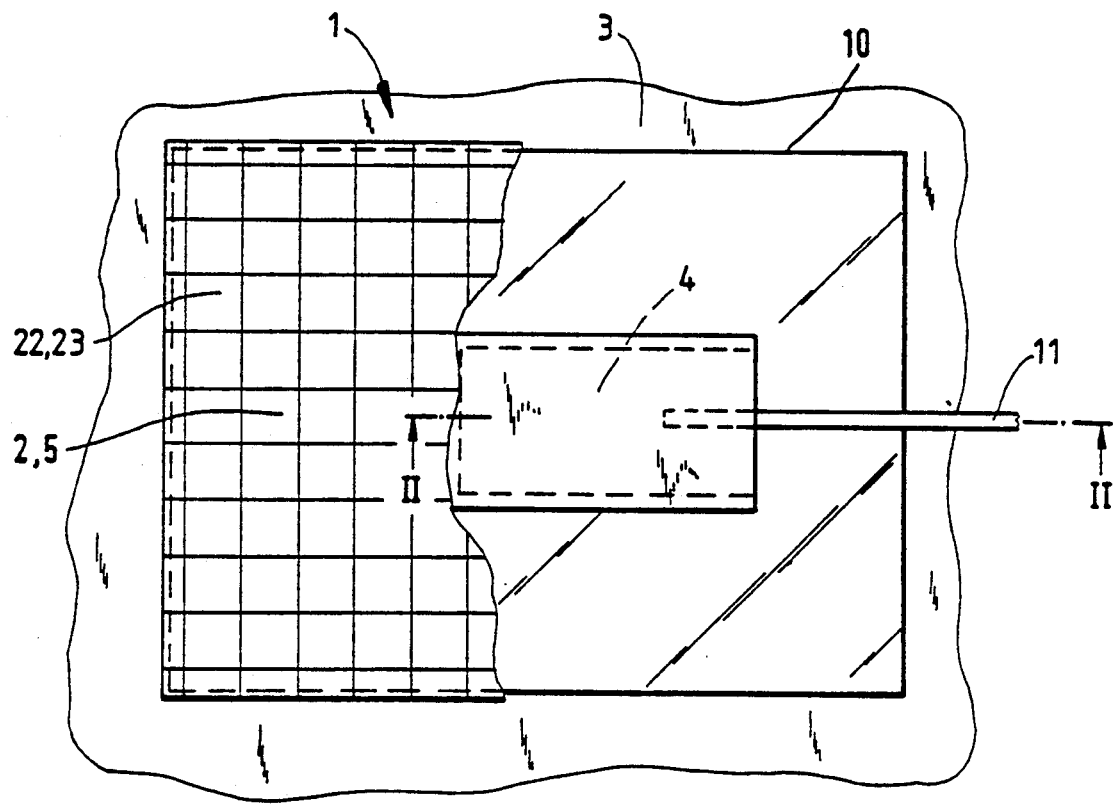
FIG. 1 illustrates a partial section of an airbag pursuant to the invention.
Figure 2:
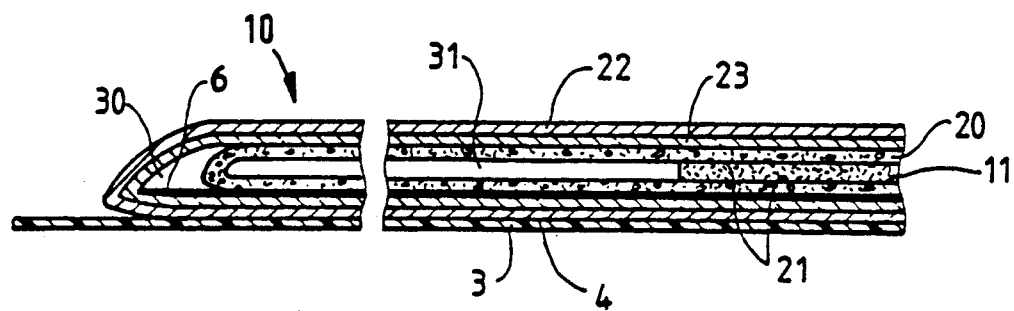
FIG. 2 illustrates a sectional view taken along line II—II in FIG. 1.

A module 10 consists of crosswisely arranged fabric strips 2, 5 from a relatively gas-tightly coated fiberglass fabric, which are located on a heat-resistant foil 6.

The gas-generating module 10 is adhesively fastened to an airbag fabric 3 at location 4 and possesses an ignition cable 11 which is conducted out from an airbag 1.

An elastic, foil-shaped and gas-generating composition 20 with an internal igniting mixture 21 is covered in the direction towards the fabric 3 of the airbag opposite peripherally-sided fiberglass-reinforced strips 2, 5 by means of a heat-reflecting foil 6.

The gas-generating composition 20 consists of:

| | |
|---|---|
| $NaN_3$ | 33% by weight |
| $KNO_3$ | 65% by weight |
| grain size | <80 μm |
| Nitrocellulose | 2% by weight |

This composition is kneaded together with a suitable solvent and granulated into particles each possessing a granule size of about 500 μm; however, possibly also a granule size within a range of 200 to 2,000 μm.

After the drying of the granulates, these are coated with a thin layer of a rapidly combusting igniting mixture. As a result, there is present a significant increase in the speed of burning.

The granulated gas-generating composition which is prepared in this manner is then provided with a second elastic igniting medium, consisting of silicon rubber at a constituent of 3 to 50%, preferably 35% by weight relative to the gas-generating composition. Thereafter, the gas-generating composition is formed into the foil-shaped elastic layer 20. The still moist, adhesive and not yet cured or hardened layer 20 has then applied to its inside a coating of an igniting mixture consisting of boron and potassium nitrate or potassium perchlorate and titanium. Hereby, the granulate of the igniting mixture 21 adheres firmly to interior surfaces of the layer 20, and thereby render easier and accelerate the igniting and combustion of the layer 20.

After the igniting of the layer 20 through the ignition cable 11, an increasing gas pressure develops in the interspaces 30, 31, which propagates the conversion of the gas-generating layer 20.

Only at a higher pressure will the module 10 open in that the fabric strips 22, 23 tear apart. The gas then streams into the airbag 1 and fills the latter.

Due to the small-sized construction of the module 10, a plurality of modules 10 allow themselves to be arranged within the airbag in a space-saving or compact manner. Hereby, the ignition cables 11 are conducted out from the airbag 1.

The pressure-resistant casing can also be inventively constituted from a fabric of boron fibers, carbon fibers, or other suitable fibers.

What is claimed is:

1. A gas-generating module for an airbag utilized in motor vehicles, said module including a gas-generating composition and an igniting composition; and a container housing said composition, said gas-generating composition being constituted from sodium azide (NaN$_3$), potassium nitrate (KNO$_3$) and a first binder consisting of nitrocellulose; and a second elastic binder being admixed with said gas-generating composition, said gas-generating composition being an elastic coating arranged in a casing, said casing comprising a relatively gas tight fabric of densely arranged fabric strips, and a foil coated with the elastic coating encompassed and cross-wise covered with said fabric strips.

2. A module as claimed in claim 1, wherein said fabric strips comprise fiber-glass reinforced strips.

3. A module as claimed in claim 1, wherein said gas-generating composition comprises 33% by weight of sodium azide (NaN$_3$), 65% by weight of potassium nitrate (KNO$_3$) and 2% by weight of nitrocellulose.

4. A module as claimed in claim 1, wherein said second elastic binder consists of silicon rubber and comprises about 3 to 50% by weight relative to the weight of the gas-generating composition.

5. A module as claimed in claim 4, wherein said silicon rubber binder comprises about 35% by weight relative to the weight of the gas-generating composition.

6. A module as claimed in claim 1, wherein said gas-generating composition is a granulate.

7. A module as claimed in claim 6, wherein said foil is a heat-reflecting foil which covers said granulate and is locatable in a direction towards an airbag and is located opposite said fabric strips.

8. A module as claimed in claim 1, wherein an igniting mixture is applied to internal surfaces of said elastic coating.

* * * * *